United States Patent [19]

Graves

[11] Patent Number: 4,969,484

[45] Date of Patent: Nov. 13, 1990

[54] REVERSIBLE FLOW CHECK VALVE

[76] Inventor: John G. Graves, 3107 Woodward Blvd., Tulsa, Okla. 74105

[21] Appl. No.: 476,514

[22] Filed: Feb. 7, 1990

[51] Int. Cl.⁵ ............................................. F16K 15/03
[52] U.S. Cl. ............................... 137/269.5; 137/630.15
[58] Field of Search ......................... 137/269.5, 630.15

[56] References Cited

U.S. PATENT DOCUMENTS

| | | | |
|---|---|---|---|
| 709,262 | 9/1902 | Gold | 137/630.15 |
| 1,175,328 | 3/1916 | Wright | 137/614.17 X |
| 2,151,098 | 3/1939 | Greenwood | 137/614.2 X |
| 2,589,176 | 3/1952 | Wheatly | 137/269.5 |
| 3,344,808 | 10/1967 | Cary | 137/614.17 X |
| 3,348,569 | 10/1967 | Frye | 137/269.5 |
| 3,363,650 | 1/1968 | Scaramucci | 137/269.5 X |
| 3,474,818 | 10/1969 | Hartman | 137/614.2 X |
| 3,565,099 | 1/1971 | Huber | 137/269.5 |
| 3,851,665 | 12/1974 | Coughlin | 137/614.17 |
| 4,067,359 | 1/1978 | Kivast | 137/630.15 X |
| 4,308,894 | 1/1982 | Carpenter | 137/630.15 |

Primary Examiner—Alan Cohan

[57] ABSTRACT

A reversible flow check valve includes a valve body and a clapper extending across a flow passageway. A mechanism is provided to retract the clapper to permit essentially unobstructed fluid flow through the flow passageway. Further, mechanisms are provided for rotating the clapper to a first position or an opposite second position or an intermediate position to permit fluid flow in either direction. The retraction of the clapper permits the valve seats and seals to be unaffected by the rotation of the clapper, thereby preventing damage to the internal sealing mechanisms of the valve when the flow direction of the valve is reversed.

11 Claims, 7 Drawing Sheets

REVERSIBLE FLOW CHECK VALVE

BACKGROUND OF THE INVENTION

1. Field of the Invention

The present invention is directed to flow check valves and, more particularly, to such flow check valves that are reversible thereby permitting fluid flow in either desired direction.

2. Setting of the Invention

The use of check valves, which include a clapper mechanism for stopping the flow of fluid in one direction but permitting it in another direction, is well known. Conventional check valves are normally designed to be unidirectional, that is, permit flow in one direction and block flow in the other direction, and there is no mechanism of reversing this condition without removing pressure from the line in which it is installed, draining, disassembling and removing the clapper or the valve from its installation and reversing its orientation, or constructing costly by-passes around the check valve.

Others have developed check valves in which the check action of the clapper mechanism can be reversed, that is, in one position the valve permits flow in a first direction but prohibits flow in a second direction, and in which the internal orientation of the valve can be reversed so that the valve then permits flow in the second direction but prevents flow in the first direction. Reversible check valves are disclosed in the following U.S. Pat. Nos.: 3,851,665; 3,474,818; 3,363,650; 1,175,328; 2,151,098; and 3,344,808 and in copending U.S. patent application Ser. No. 390,279, filed 8/7/89.

Conventional reversible check valves require complicated sealing mechanisms and expensive machining and finishing of a plug and receiver for same in which the clapper is secured. Further, these devices must have a relatively large body-to-flow area ratio due to their basic arrangements. The possibility of valve failure due to seal failure increases due to the greater number of seals and/or sealing or machined surfaces in these devices. Further, the sealing surfaces of each of these devices experience wear and suffer abrasion when rotated or reversed. Due to their designs each reversal will deteriorate these valves+ sealing abilities, and therefore the life of these valves is shortened with each such reversal.

These valves do not permit the clapper to be retracted to a stored position to permit essentially unobstructed fluid flow therethrough. Some conventional check valves are provided with an extension of the clapper pivot shaft that extends externally of the valve body on which a wrench may be used to open the clapper. Although adequate for some purposes, the seals required around this extension of the shaft deteriorate with every movement of the clapper, and the danger is always present that the clapper may accidentally close on the seat should there be a mechanical failure within the valve, or a pressure surge, with resultant catastrophic consequences.

As there are numerous pipelines, injection and processing facilities that require reverse flow capability, there is a need for a reversible flow check valve that eliminates the above described problems associated with wear on valve seals and seats with rotational movement. There is a need for a reversible flow check valve that can have its clapper retracted when necessary for reverse flow, or when pipeline pigs or other equipment is passed therethrough, with the hazard of accidental closing eliminated.

Another problem associated with the opening and/or retraction of clappers in check valves is that of high pressure downstream of the clapper and low pressure upstream, as can occur when pumps or compressors stop. In high pressure applications, the force exerted on the clapper in the direction toward the clapper's seat can be relatively tremendous, and any attempt to open or retract the clapper is futile. Although bypasses around valves to reduce pressure differentials are known in the industry, there is a need for a device to reduce pressure differentials that is integral with the clapper of a check valve so that its function can be accomplished using the same device used to open the clapper, without the need for external piping, controls, or devices.

SUMMARY OF THE INVENTION

The present invention has been designed to meet the above described needs and is contemplated to overcome the foregoing deficiencies.

Specifically, the present invention is a reversible flow check valve which has a valve body with a flow passageway therethrough and a clapper pivotally mounted therein. Devices are provided for retracting the clapper to permit essentially unobstructed fluid flow through the flow passageway. Further, devices are provided for rotating the clapper to a first position to permit fluid flow through the flow passageway in a first direction, but prevent flow in an opposite second direction, and for rotating the clapper to a second position to permit fluid flow through the flow passageway in the second direction, but prevent flow in the opposite first direction.

One of the benefits of the present invention is that when the valve's flow direction is to be changed, the clapper is first retracted, then rotated so that no abrasive or frictional forces are applied to the internal valve seats and seals by way of the clapper being rotated. Another benefit is that when the clapper is rotated to an intermediate position, both seats are shielded and accidental closing of the valve is prevented. Another benefit of the invention is the provision of an internal mechanism, cooperable with the clapper and clapper retracting device, that provides pressure differential equalization.

DETAILED DESCRIPTION OF THE PREFERRED EMBODIMENTS

The present invention comprises a reversible flow check valve which includes a valve body having a flow passageway therethrough. A clapper is pivotally mounted within the valve body and extends into the flow passageway to selectively block fluid flow therethrough. Mechanisms are provided for retracting the clapper to permit essentially unobstructed fluid flow through the flow passageway. Further, mechanisms are provided for rotating the clapper to a first position to permit fluid flow through the flow passageway in a first direction but prevent fluid flow in an opposite second direction; and to a second position to permit fluid flow through the flow passageway in the second direction but prevent fluid flow in the opposite first direction.

Figure 1:
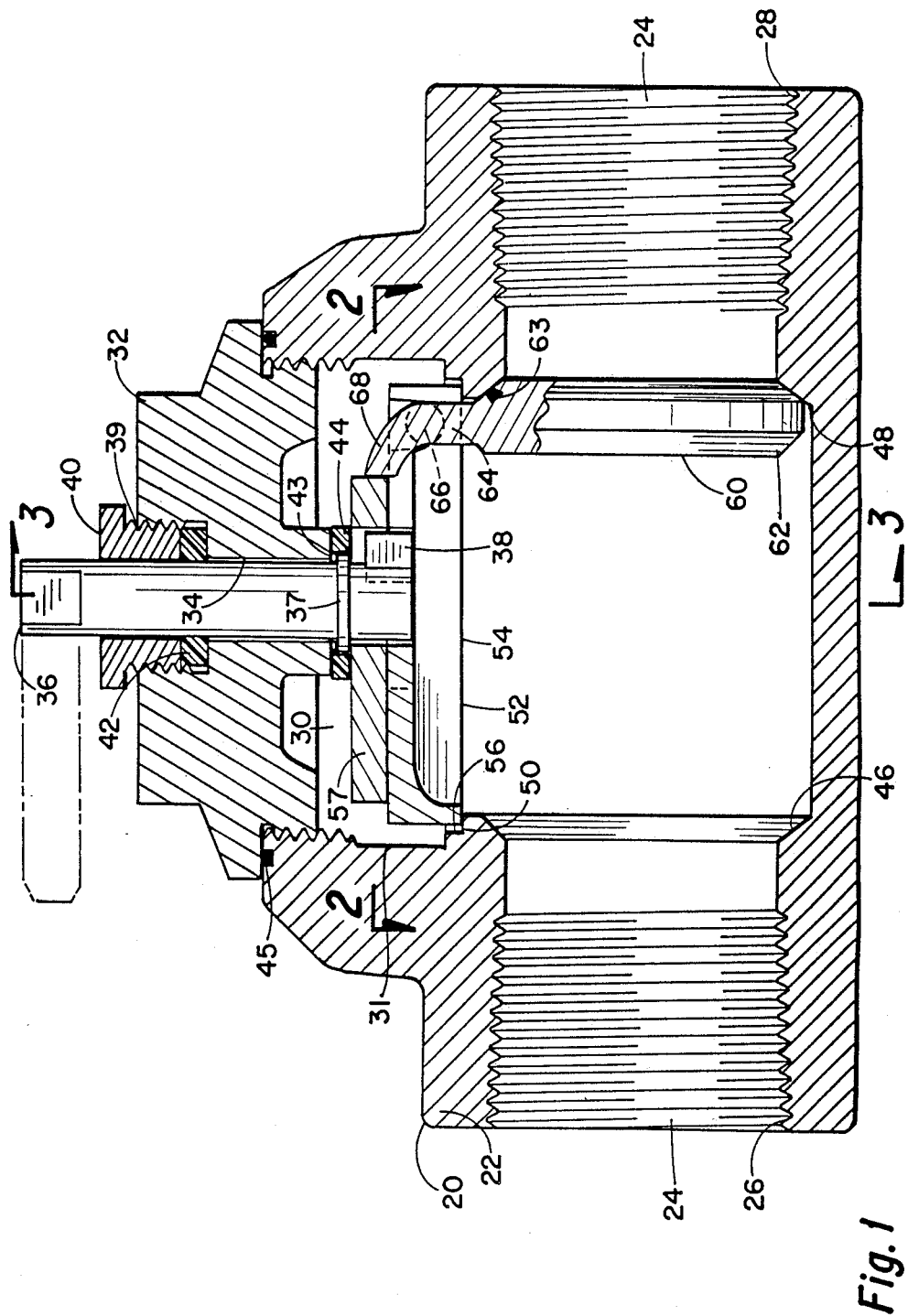
FIG. 1 is a cross-sectional view of one embodiment of a valve of this disclosure providing a reversible flow check valve.

Referring to FIG. 1, a valve 20 which exemplifies the principles of the present invention is shown. The valve 20 includes a valve body 22 having a flow passageway 24 therethrough. The valve body 22 is provided with mechanisms for connection to other fluid flow conducting members, such as by the provision of external or internal threads 26 and 28 at each end of the valve body 22.

Formed in the top of the valve body 22 is a secondary opening 30 which provides communication to the flow passageway 24 within the valve body. The opening 30 is threaded internally, and is closed by a bonnet member 32, which is externally threaded as shown, or the bonnet 32 can be bolted upon the valve body 22. The bonnet member 32 has an internal opening 34 therethrough which rotatably receives a stem 36. The stem 36 is provided with a shoulder 37. The inner end of the stem 36 is provided with an integral key 38. The opening 34 has an enlarged internally threaded portion 39 to accept an externally threaded seal or plug 40, which, when tightened, provides a fluid tight seal between the stem 36 and the bonnet 32 by compressing an annular packing 42. Additionally, a resilient, low-friction thrust washer 43 is spaced between the stem shoulder 37 and the bonnet 32, and a washer 44 is spaced between an eccentric disc 57 and the bonnet 32. The washers 43 and 44 provide for ease of rotation of the stem 36 and allow for wider manufacturing tolerances. An ring 45 can be provided to prevent fluid leakage between the bonnet 32 and the body 22.

Figure 2:
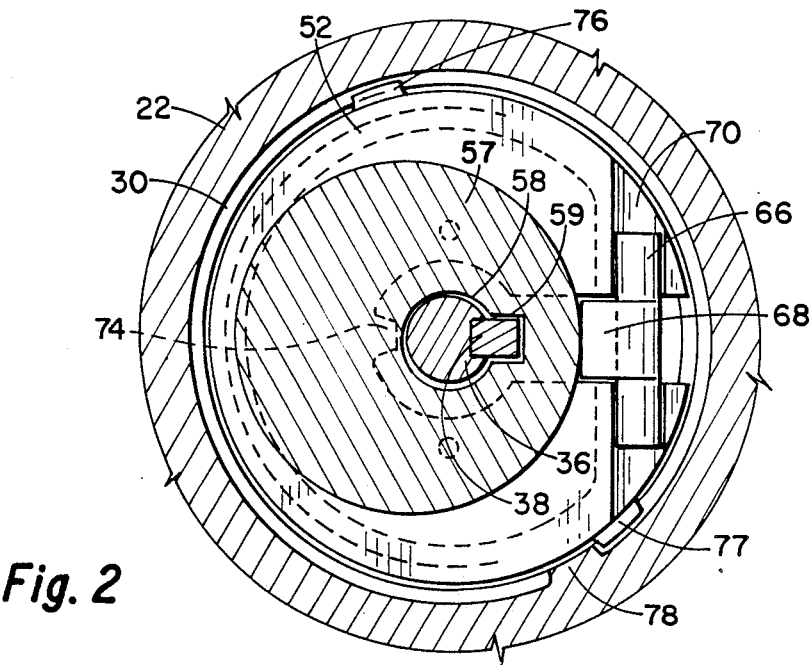
FIG. 2 is a cross-sectional view taken along Line 2—2 of FIG. 1 of the device for retraction and rotation of a clapper as employed in the valve of FIG. 1.

Formed in the valve body 22 are seats 46 and 48, which can be integral as shown, or removable, as is well known to those skilled in the art. Also formed in the valve body 22 is an annular carrier support lip 50. The lip 50 is circular and rotatably supports a clapper carrier 52. The carrier 52 can be a one piece casting for economy of manufacturing, and has a bottom portion 54 which is circular and of an outside diameter slightly smaller than the vertical inside diameter portion 56 of the support lip 50, providing ease of rotation. The eccentric disc 57 is slideably, but not rotatably, positioned on the stem 36 between the carrier 52 and the stem shoulder 37. Vertical travel of the stem 36 is prevented by the shoulder 37, as shoulder 37 is larger than the bonnet opening 34 and larger than an eccentric disc hole 58, as shown in FIG. 2. The stem key 38 is slideably received in an eccentric disc key way 59, as shown in FIG. 2.

Figure 10:
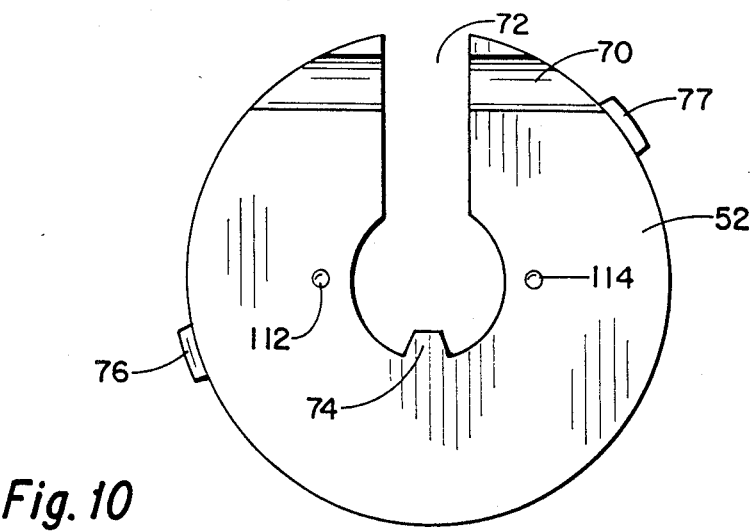
FIG. 10 is a plan view of a carrier used in FIG. 3.

A clapper member 60 is, in this preferred embodiment, a one piece casting comprising a body portion 62 of a size to be received in the passageway 24 and conform to and seat upon the seat 46 or 48. The body portion 62 can be fitted with a resilient seal, such as an O-ring 63. A tongue 64 extends upwardly from the body portion 62, and above the tongue 64 is a pivot pin 66. A lever-arm 68 extends upwardly and towards the center of the valve body 22 from the tongue 64. As shown in FIGS. 2 and 10, the pivot-pin 66 is pivotally received in a groove 70 of the carrier 52. As shown in FIGS. 1 and 2, the carrier 52 is constructed so that when assembling, the clapper 60 is positioned beneath the carrier 52 in a position that places the pivot pin 66 and a slot 72 of the carrier parallel to each other, thence, the clapper 60 and thereby the pivot pin 66 are raised to a point where the pivot pin 66 is above the top of the carrier 52, and thence, the clapper 60 is rotated 90° and moved to place the pivot pin 66 into the groove 70.

Figure 4B:
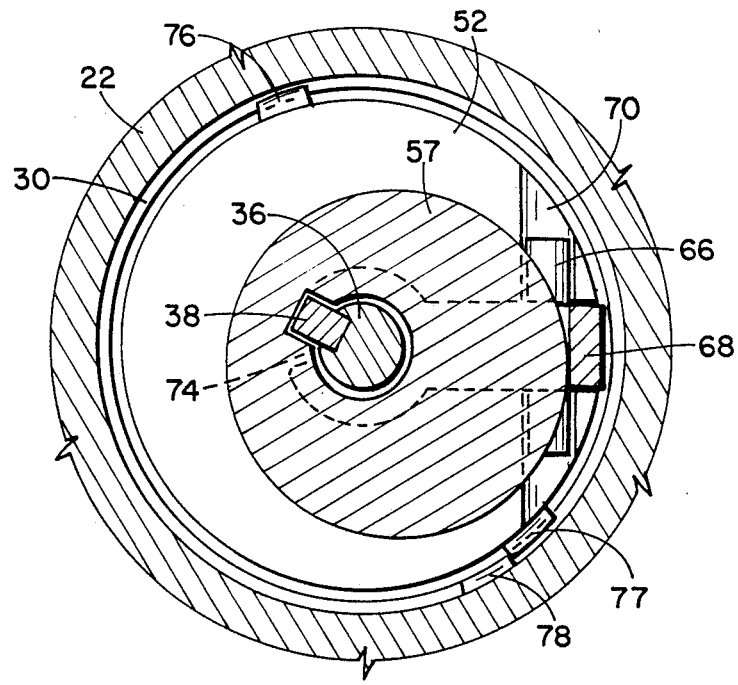
FIG. 4B is a cross-sectional view taken along Line 4B—4B of FIG. 4A showing the carrier, eccentric disc and stem of the valve of FIG. 4A.
Figure 4A:
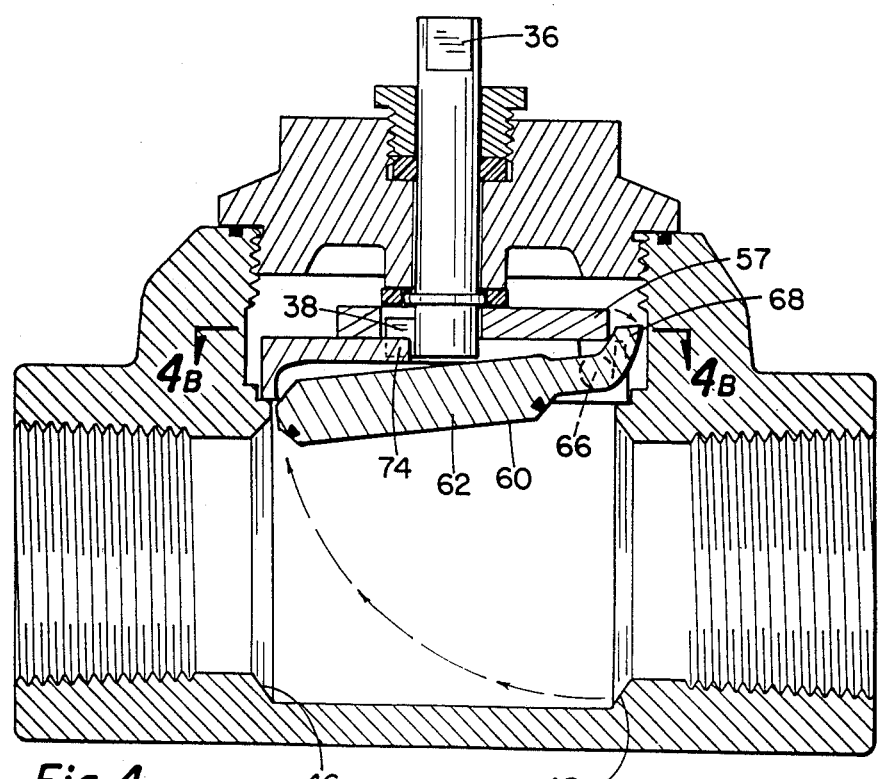
FIG. 4A is a cross-sectional view of the valve of FIG. 1 showing a clapper therein raised to a retracted position.
Figure 5B:
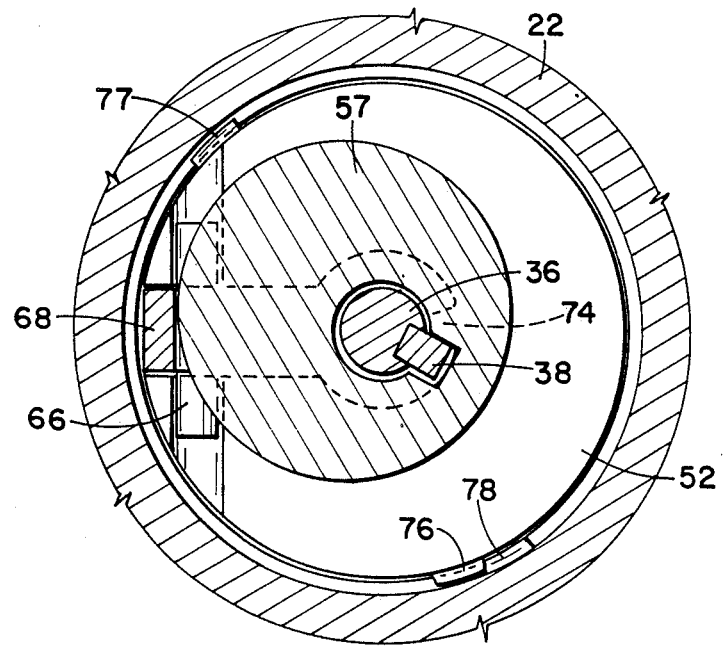
FIG. 5B is a cross-sectional view taken along Line 5B—5B of FIG. 5A showing the carrier, eccentric disc and stem of the valve of FIG. 5A.
Figure 5A:
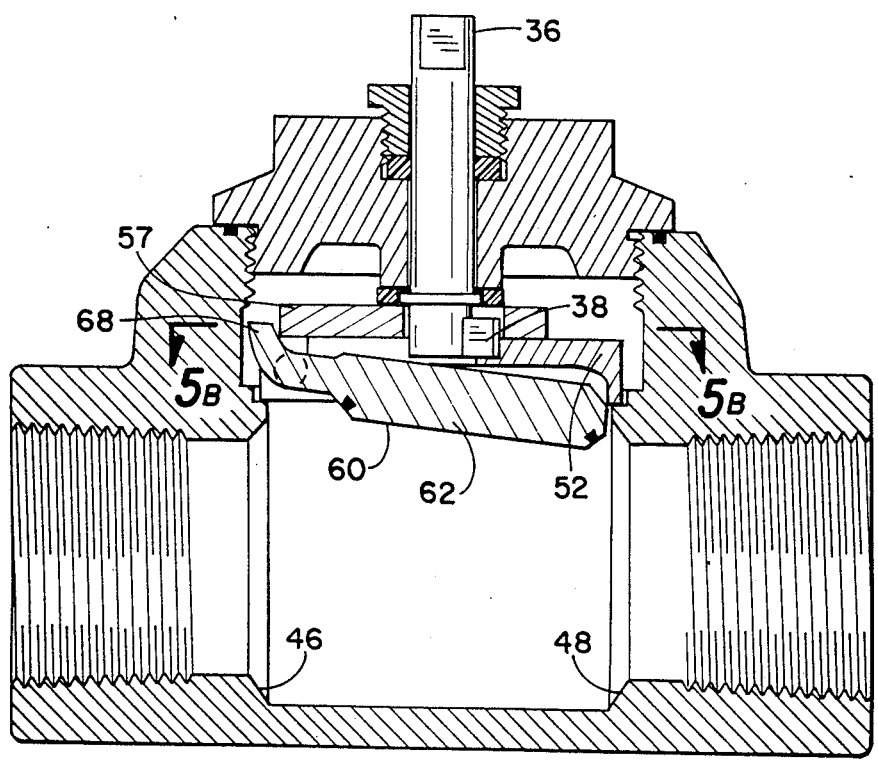
FIG. 5A is a cross-sectional view of the valve of FIG. 4A showing the clapper and carrier rotated to an opposite position.
Figure 6B:
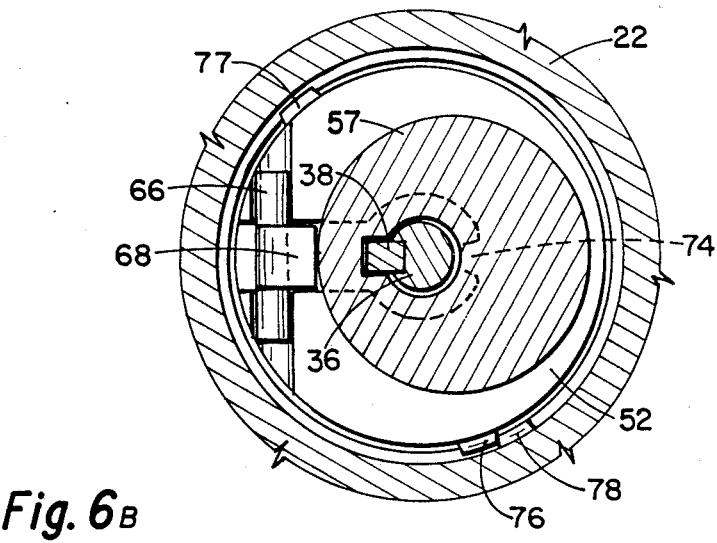
FIG. 6B is a cross-sectional view taken along Line 6B—6B of FIG. 6A showing the carrier, eccentric disc and stem of the valve of FIG. 6A.
Figure 6A:
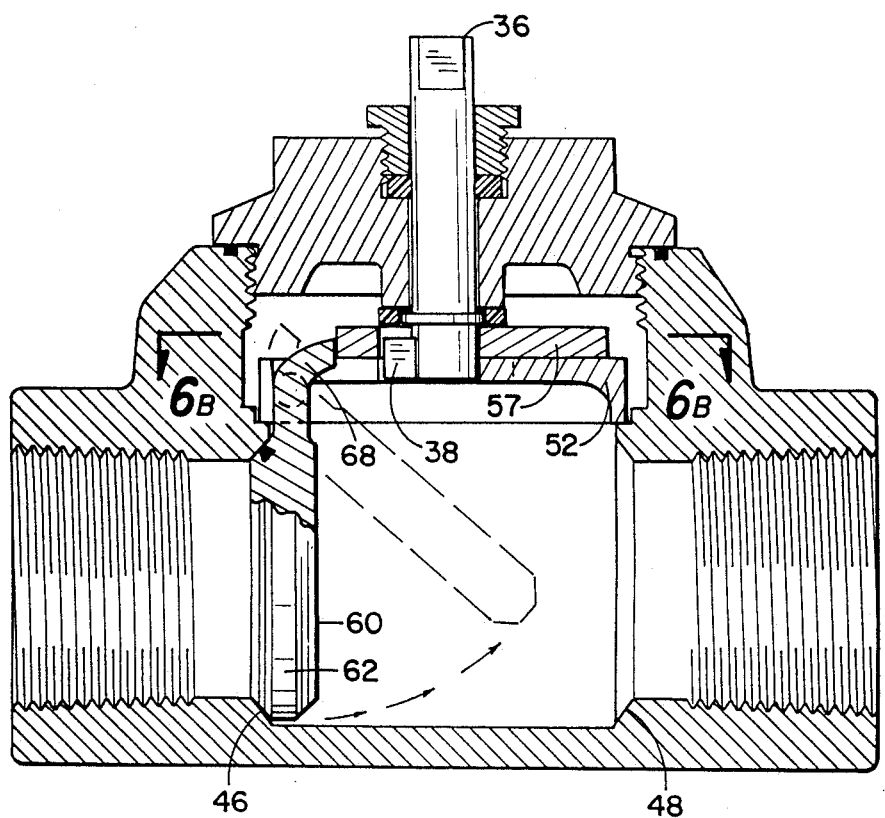
FIG. 6A is a cross-sectional view of the value of FIG. 5A showing the stem and eccentric disc rotated to allow the clapper to close the passageway.

As can be seen in FIGS. 1 and 2, the position of the stem 36, the eccentric disc 57 and the stem key 38 are such that the eccentric disc 57 does not apply force to the clapper lever arm 68. Therefore, the clapper 60 is free to pivot and function as a conventional check valve, i.e., allowing flow of fluid from right to left (as viewed in the Figures) but prohibiting flow in the reverse direction. When reversal of the flow is desired, rotation of the stem 36 by a device such as a handle (shown in dotted lines in FIG. 1) will therefore also rotate the eccentric disc 57, which due to its eccentricity, will contact the lever arm 68, and further rotation will pivot the lever arm 68 to the right and the clapper body portion 62 to the left which lifts, without abrasion or wear, the clapper body portion 62 away from the seat 48, and into the position shown in FIGS. 4A and 4B. In this position, the clapper body portion 62 is essentially or completely clear of the flow path. Further rotation of the stem 36 engages the stem key 38 with a carrier lug 74 which allows the carrier 52, and therefore the clapper 60, to be rotated to a position opposite the first position, at which point a carrier stop 76 engages a valve body stop lug 78 which prohibits additional rotation, as shown in FIGS. 5A and 5B. Now, rotation of stem 36 in the opposite direction will rotate only the eccentric disc 57, and the stem key 38, not the carrier 52, and the rotating eccentricity of disc 57 will allow the lever arm 68 to pivot again towards the center of the valve body 22, and the clapper body portion 62 to pivot into a position to conform to and seat upon the seat 46, which will allow flow from left to right, as shown in FIGS. 6A and 6B, but prohibit flow from right to left. Further, rotation of the clapper 60 by way of rotation of the stem 36, eccentric disc 57 and the carrier 52 can be halted at a position intermediate between the first and second position to permit fluid flow in either direction without the clapper 62 preventing fluid flow.

Figure 3:
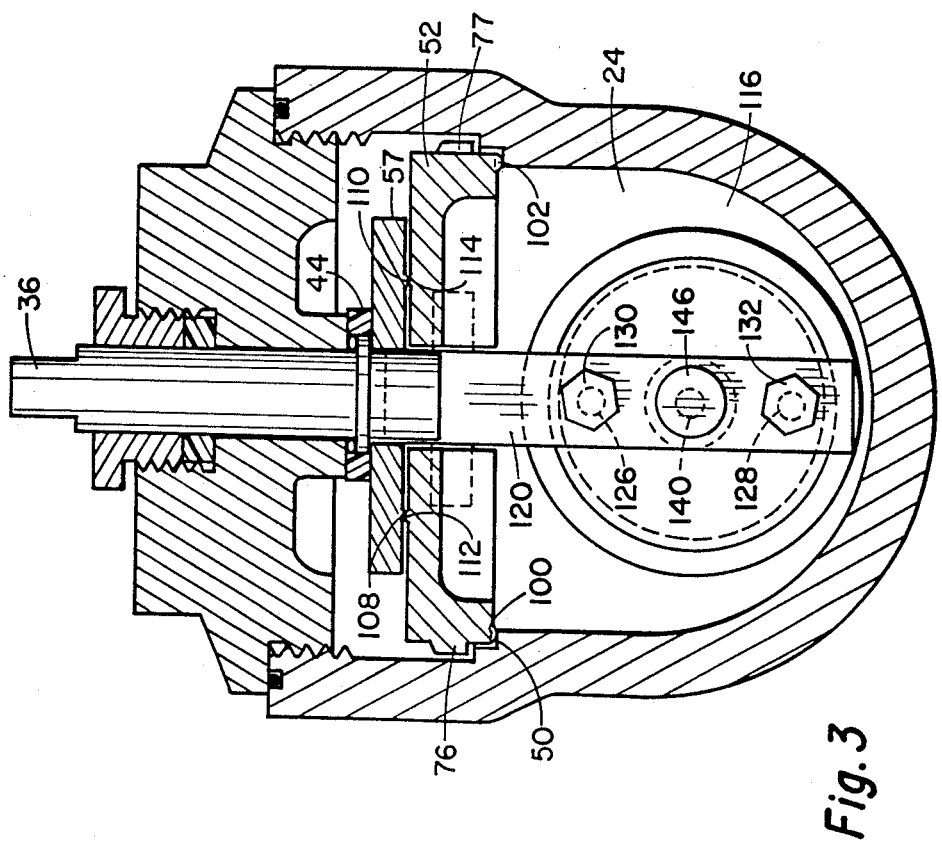
FIG. 3 is a cross-sectional view, taken along the Line 3—3 of FIG. 1, showing the valve of FIG. 1 and the clapper of FIG. 7.

The carrier 52 is provided with two positioning pins 100 and 102, which can be seen in FIG. 3, which cooperate with two small indentations cast into the support lip 50. When the carrier 52 is rotated and stopped by the contact of the carrier stop 76 and the valve body stop lug 78, as shown in FIG. 2, these positioning pins 100 and 102 simultaneously recess into the indentations further ensuring proper carrier position.

With reference to FIG. 1, the secondary opening 30 can be provided with a slightly enlarged diameter portion 31 in which the lever arm 68 and the carrier stops 76 and 77 travel during rotation. It is in this portion 31 that the valve body stop lug 78 is cast, as shown in FIG. 2.

With reference to FIG. 3, the bottom surface of the eccentric disc 57 is provided with positioning pins 108 and 110 which cooperate with raised portions 112 and 114 on the top surface of carrier 52. When the position of the valve clapper has been reversed and the stem 36 is rotated in the opposite direction to lower the clapper into position through the rotation of the eccentric disc 57, the pins 108 and 110 will contact the raised portions 112 and 114 when the stem 36 has reached its proper position, and thereby apply a downward force against the carrier 52 and an upward force against the eccentric disc 57, and thereby compress the washer 44, further ensuring proper position of the carrier 52 and the stem 36.

Figure 7:
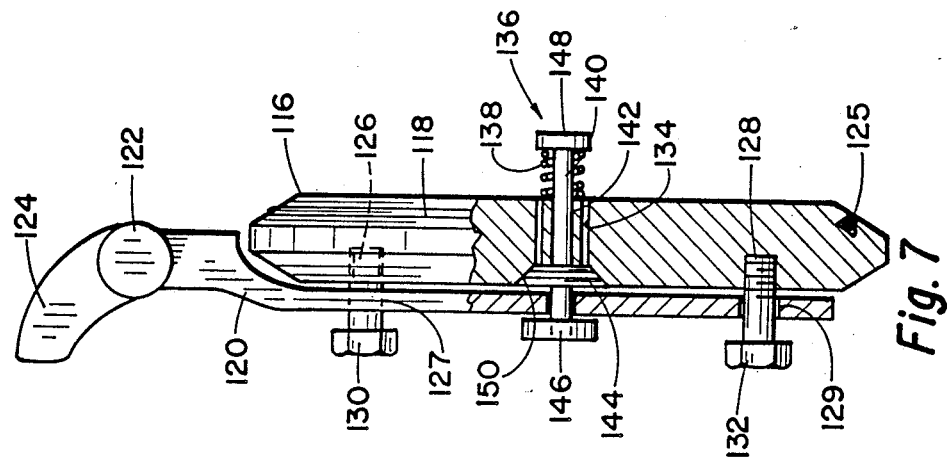
FIG. 7 is an elevational cross-sectional view of a clapper with mechanisms for equalizing pressure thereacross.

Another feature of this invention is that a mechanism is provided to equalize pressure on both sides of the valve should a situation exist where excessive pressure downstream of the valve could interfere with normal reversal of the valve's components. This feature provides an internal mechanism, cooperable with the clapper and activated by the same device used to retract the clapper, to equalize pressure on either side of the clapper. FIG. 7 shows an alternate clapper mechanism generally designated by reference numeral 116. Clapper 116 comprises a body portion 118, a tongue 120, a pivot pin 122 and a lever arm 124. The body portion 118 is of a size to be received in the passageway 24 of the valve of FIG. 3 and of a size to conform to and seat upon the seat 46 or 48. The body portion 118 can be fitted with a seal, such as an 0-ring 125. The body portion 118 is attached to the tongue 120 by way of bolts 126 and 128. Tongue holes 127 and 129 are of a slightly larger diameter than the bolts 126 and 128, so the tongue 120 pivots slightly away from the body portion 118 prior to engaging head portions 130 and 132 of the bolts 126 and 128. The body portion 118 is provided with a small passageway 134 which is provided with a checking device, such as a poppet valve 136. This checking device is constructed to allow the flow of fluid in the same direction the clapper body portion 118 allows flow, and to likewise prohibit flow in an opposite direction. In this embodiment, the poppet valve 136 includes a spring 138, a stem 140, a guide 142, a valve 144, a stem head 146, a keeper 148, and a valve seat 150. The spring 138 serves to keep the poppet valve 136 normally closed, therefore fluid pressure upstream of the clapper 116 will open only the clapper body portion 118, not the poppet valve 136. Fluid pressure downstream of the clapper 116 maintains the poppet valve 136 in the closed position. Therefore, passageway 134 is closed except when manually retracting the clapper as described below.

When reversal of the valve is desired, as described above referencing FIG. 1, rotation of the stem 36, and thereby the eccentric disc 57, applies force to the lever arm 124 in the same manner as previously described. However, as the tongue 120 responds to the pivoting action, it first opens the poppet valve 136 by moving the valve stem head 146, and thereby the valve 144, away from the seat 150 prior to the tongue 120 engaging the bolt head portions 130 and 132. With the poppet valve 136 so opened, counterflow can occur, and any excessive pressure on the left, or downstream side of the clapper body portion 118 is allowed to pass through the passageway 134, and once the pressure differential on either side of the body portion 118 is minimized, continued rotation of stem 36 will cause the tongue 120 to engage the bolt head portions 130 and 132 and thereby raise the body portion 118 and reverse the valve in the same manner as described with reference to FIG. 1.

Figure 8:
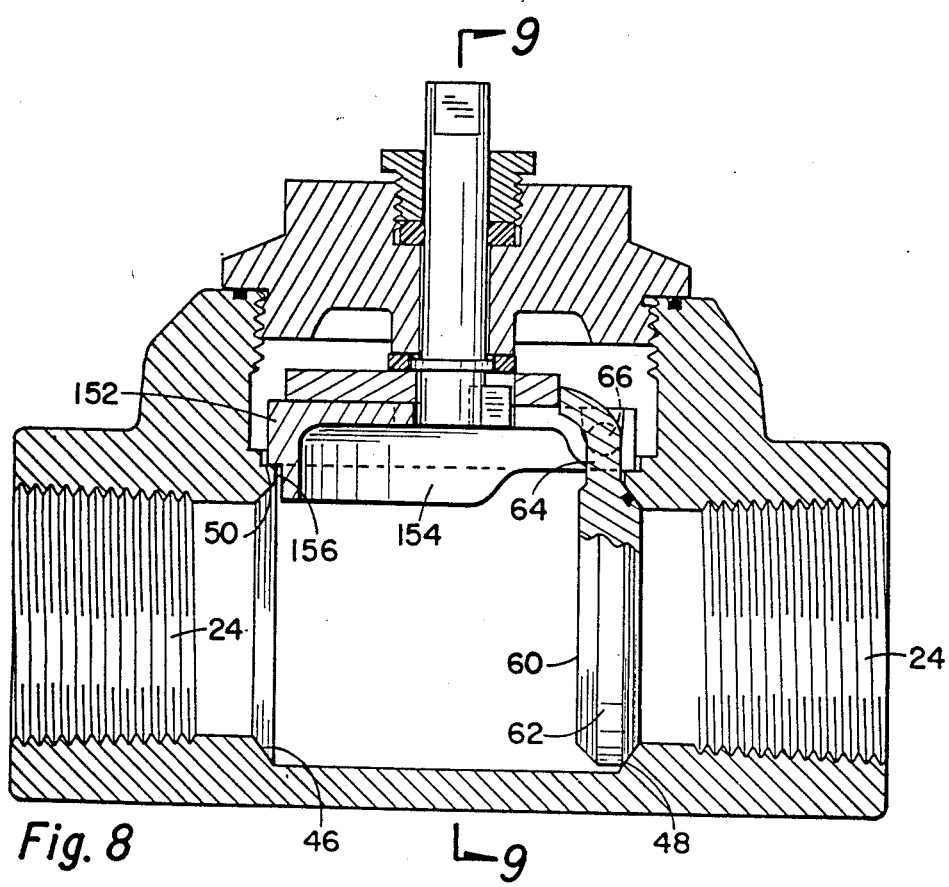
FIG. 8 is a cross-sectional view of another embodiment of the valve of this disclosure with integral carrier devices to prevent accidental seating of the clapper in the event of mechanical failure within the valve.
Figure 9:
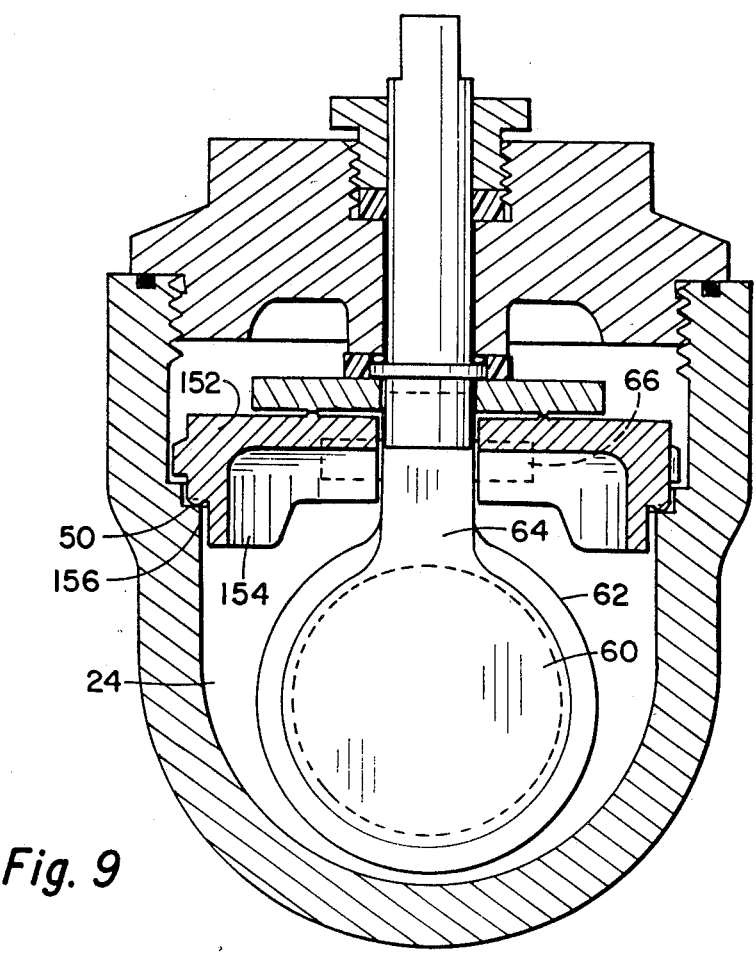
FIG. 9 is a cross-sectional view of the valve of FIG. 8 taken along the Line 9—9 of FIG. 8.

As an accidental or unintentional closing of a valve can be catastrophic, FIG. 8 shows another embodiment of a carrier with a mechanism to prevent accidental or unintended seating of the clapper 60. As shown in FIGS. 8 and 9, a carrier 152 is provided with an integral semi-circular skirt 154 that is annular in configuration extending beneath the lower surface of the carrier 152 with an inside diameter of a size sufficient to allow the full opening of the clapper 60, and an outside diameter smaller than an inside diameter 156 of carrier support lip 50. The skirt 154 extends downward from the bottom surface of the carrier 152 to a location that is nearly parallel to the top of the flow passageway 24, thereby shielding the upper portion of the seat 46. A carrier with this feature of construction therefore blocks the upper portion of the downstream seat 46 yet is still essentially above and clear of the flow passageway 24. This feature ensures that, in the event of a mechanical failure or breakage of the clapper tongue 64 or pivot pin 66, the clapper body portion 62 is prohibited from seating on the downstream seat 46 and unintentially blocking fluid flow. Additionally, when the valve has been placed in an open position by rotation of carrier 152 to a position perpendicular to the flow passageway 24, this feature blocks the top of both seats 46 and 48 and unintentional seating of the clapper body portion 62 on either seat is prohibited.

Whereas the present invention has been described in relation to the above described drawings, it should be understood that other and further modifications, apart from those shown or suggested herein, may be made within the scope and spirit of the present invention.

What is claimed is:

1. A reversible flow check valve comprising:
a valve body having a flow passageway therethrough;
a clapper pivotally mounted within the valve body and extending into the flow passageway to selectively block fluid flow therethrough;
means for retracting the clapper to permit essentially unobstructed fluid flow through the flow passageway; and
means for rotating the clapper to a first position to permit fluid flow through the flow passageway in a first direction but prevent fluid flow in an opposite second direction, and to a second position to permit fluid flow through the flow passageway in the second direction but prevent fluid flow in the opposite first direction.

2. A reversible flow check valve of claim 1 wherein the means for retracting the clapper prevents frictional and abrasional damage to the clapper during rotation thereof.

3. A reversible flow check valve of claim 1 wherein the means for retracting the clapper comprises rotatable means for cooperable transfer of movement to an extension on an end portion of the clapper for retraction of the clapper.

4. A reversible flow check valve of claim 3 wherein the rotatable means comprises a horizontally disposed disc in operative contact with the clapper extension and an exteriorally extending stem connected to the disc.

5. A reversible flow check valve of claim 1 wherein the means for rotating the clapper comprises a clapper carrier rotatably mounted within the valve body, the clapper being pivotally mounted from the clapper carrier, and an exteriorally extending stem connected to the carrier.

6. A reversible flow check valve of claim 1 wherein the valve body includes a secondary opening in communication with the flow passageway and clapper; means for retracting the clapper and means for rotating the clapper being accessible through the secondary opening; and a bonnet removably closing the secondary opening.

7. A reversible flow check valve of claim 1 wherein the means for rotating the clapper further permits the clapper to be rotated to an intermediate position between the first and second position to permit fluid flow in either the first or the second direction.

8. A reversible flow check valve of claim 1 wherein the clapper includes means to prevent accidental seating of the clapper against a downstream seat within the valve body.

9. A reversible flow check valve of claim 1 wherein the clapper includes means to equalize pressure differentials on either side thereof.

10. A reversible flow check valve of claim 9 wherein the means to equalize pressure differentials comprises a poppet valve mechanism.

11. A flow check valve comprising:
a valve body having a flow passageway therethrough;
a clapper pivotally mounted within the valve body and extending into the flow passageway to selectively block fluid flow therethrough;
means for rotating the clapper to a first position to permit fluid flow through the flow passageway in a first direction but prevent fluid flow in an opposite second direction, and to a second position to permit fluid flow through the flow passageway in the second direction but prevent fluid flow in the opposite first direction; and
means in communication with the flow passageway for equalizing pressure differentials on either side of the clapper.

* * * * *